(12) United States Patent
Okahashi et al.

(10) Patent No.: US 11,333,909 B2
(45) Date of Patent: May 17, 2022

(54) OPTICAL WAVEGUIDE ELEMENT, OPTICAL MODULATOR, OPTICAL MODULATION MODULE, AND OPTICAL TRANSMISSION DEVICE

(71) Applicant: SUMITOMO OSAKA CEMENT CO., LTD., Tokyo (JP)

(72) Inventors: Kousuke Okahashi, Tokyo (JP); Toru Sugamata, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 17/105,615

(22) Filed: Nov. 26, 2020

(65) Prior Publication Data

US 2021/0199997 A1 Jul. 1, 2021

(30) Foreign Application Priority Data

Dec. 26, 2019 (JP) .............................. JP2019-235614

(51) Int. Cl.
*G02F 1/03* (2006.01)
*G02F 1/035* (2006.01)
*G02F 1/225* (2006.01)

(52) U.S. Cl.
CPC .......... *G02F 1/0356* (2013.01); *G02F 1/0316* (2013.01); *G02F 1/2252* (2013.01)

(58) Field of Classification Search
CPC ..... G02F 1/0356; G02F 1/0316; G02F 1/2252
See application file for complete search history.

(56) References Cited

U.S. PATENT DOCUMENTS

| 5,895,742 A * | 4/1999 | Lin | G02F 1/035 430/321 |
| 6,226,423 B1 * | 5/2001 | Minakata | G02F 1/035 385/14 |

(Continued)

FOREIGN PATENT DOCUMENTS

| JP | 2004070301 | 3/2004 |
| JP | 2009181108 | 8/2009 |

OTHER PUBLICATIONS

Muraro et al., Design Optimization of Lithium Niobate Modulators using a Genetic Algorithm, Anais do V Worcap, Inpe, São José dos Campos, 26 e 27 de outubro de 2005. (Year: 2005).*

(Continued)

*Primary Examiner* — Peter Radkowski
(74) *Attorney, Agent, or Firm* — JCIPRNET

(57) ABSTRACT

An optical waveguide element is provided to effectively reduce an optical absorption loss of waveguide light which may occur at an intersecting part between an optical waveguide and an electrode without causing deterioration in optical characteristics and degradation of long-term reliability of the optical waveguide element. The optical waveguide element includes an optical waveguide formed in a substrate, and an electrode controlling optical waves propagated in the optical waveguide and having an intersecting part intersecting the optical waveguide thereabove. A portion of a resin layer is provided between the optical waveguide and the electrode in a portion of the substrate including the intersecting part. A corner of the resin layer on a side of the electrode is constituted to be a curve in a cross section in an extending direction of the electrode.

13 Claims, 13 Drawing Sheets

(56) References Cited

U.S. PATENT DOCUMENTS

| | | | | |
|---|---|---|---|---|
| 7,290,328 B2* | 11/2007 | Kondo | | G02F 1/225 29/592.1 |
| 8,712,204 B2* | 4/2014 | Kondo | | G02F 1/035 385/132 |
| 9,905,741 B2* | 2/2018 | Oyu | | H01L 24/18 |
| 2002/0159738 A1* | 10/2002 | Aoki | | G02F 1/2255 385/129 |
| 2003/0142896 A1 | 7/2003 | Kikuchi et al. | | |
| 2003/0228413 A1 | 12/2003 | Ohta et al. | | |
| 2004/0136655 A1* | 7/2004 | Aoki | | G02F 1/225 385/40 |
| 2005/0039322 A1* | 2/2005 | Kondo | | G02F 1/2255 29/592.1 |
| 2006/0120654 A1* | 6/2006 | Aoki | | G02F 1/2255 385/2 |
| 2007/0147722 A1* | 6/2007 | Kondo | | G02F 1/2255 385/2 |
| 2012/0018772 A1* | 1/2012 | Nishijima | | H05K 5/0091 257/99 |
| 2013/0011093 A1* | 1/2013 | Goh | | H04B 10/5051 385/3 |
| 2014/0239318 A1* | 8/2014 | Oyu | | H01L 24/82 257/88 |
| 2014/0241659 A1* | 8/2014 | Fukuda | | G02F 1/2257 385/3 |
| 2014/0339523 A1* | 11/2014 | Fukagawa | | H01L 51/5253 257/40 |
| 2016/0313393 A1* | 10/2016 | Takemura | | H05K 1/0313 |

OTHER PUBLICATIONS

Weigel et al., Reducing the thermal stress in a heterogeneous material stack for large-area hybrid optical silicon-lithium niobate waveguide microchips, Optical Materials 66 (2017) 605e610 (Year: 2017).*

* cited by examiner details of part A

OPTICAL WAVEGUIDE ELEMENT, OPTICAL MODULATOR, OPTICAL MODULATION MODULE, AND OPTICAL TRANSMISSION DEVICE

CROSS REFERENCE TO RELATED APPLICATIONS

This application claims the priority benefit of Japanese Patent Application No. 2019-235614, filed on Dec. 26, 2019. The entirety of the above-mentioned patent application is hereby incorporated by reference herein and made a part of this specification.

BACKGROUND

Technical Field

The disclosure relates to an optical waveguide element, an optical modulator, an optical modulation module, and an optical transmission device.

Description of Related Art

In high-speed/large-capacity optical fiber communication systems, an optical modulator into which an optical modulation element serving as an optical waveguide element constituted of an optical waveguide formed on a substrate is incorporated is often used. Among these, since optical modulation elements, in which $LiNbO_3$ (hereinafter, which will also be referred to as LN) having an electro-optical effect is used as a substrate, have a small loss of light and can realize broadband optical modulation characteristics, they are widely used in high-speed/large-capacity optical fiber communication systems. In optical modulation elements using such a LN substrate, for example, a Mach-Zehnder optical waveguide and a signal electrode for applying a high-frequency electrical signal (modulation signal) to the optical waveguide are provided.

Particularly, regarding a modulation method in an optical fiber communication system, in response to the recent trend of increasing transmission capacity, multi-level modulation such as quadrature phase shift keying (QPSK) and dual polarization-quadrature phase shift keying (DP-QPSK) and a transmission format adopting polarization multiplexing in multi-level modulation have become mainstream, and these are not only used in key optical transmission networks but have also been introduced to metro networks.

Optical modulators performing QPSK modulation (QPSK optical modulator) and optical modulators performing DP-QPSK modulation (DP-QPSK optical modulator) include a plurality of Mach-Zehnder optical waveguides having a nested structure (so-called nest type), and each of the optical waveguides includes at least one signal electrode. In addition, in optical modulators using such Mach-Zehnder optical waveguides, generally, a bias electrode for compensating for variation in bias points due to so-called DC drift is also formed.

Such a signal electrode or a bias electrode (which will hereinafter be generically referred to simply as an electrode) is formed to extend to a part in the vicinity of an outer circumference of a LN substrate for connection to an electric circuit outside the substrate. For this reason, a plurality of optical waveguides and a plurality of electrodes intersect each other in a complicated manner on the substrate, and a plurality of intersecting parts at which the electrodes cross the optical waveguides thereabove is formed.

If the optical waveguides and the electrodes are formed to be in direct contact with each other in the foregoing intersecting parts, light propagated in the optical waveguides is absorbed by metal constituting the electrodes, and thus an optical loss (optical absorption loss) occurs in these intersecting parts. For example, this optical loss causes a difference between optical losses of two parallel waveguides constituting a Mach-Zehnder optical waveguide and may cause deterioration in extinction ratio of modulated light. Since required conditions for the extinction ratio become stricter as an increasing modulation speed is required for an optical modulator, it is expected that such deterioration in extinction ratio will become more apparent as the modulation speed increases in accordance with the increasing transmission capacity.

In addition, the foregoing intersecting parts may be extensively and generally formed not only in optical modulators using a Mach-Zehnder optical waveguide but also in directional couplers, optical modulators using optical waveguides constituting Y-branches, and/or optical waveguide elements such as optical switches. Further, the number of intersecting parts on a substrate will further increase as optical waveguide patterns and electrode patterns become more complicated due to optical waveguide elements being increasingly reduced in size, being multi-channeled, and/or being highly integrated. This will become a non-negligible cause of loss and may limit the performance of optical waveguide elements.

In the related art, regarding a technology of reducing an optical absorption loss due to electrode metal formed on an optical waveguide, a technology in which a buffer layer consisting of $SiO_2$ is provided on a surface of a substrate on which an optical waveguide is formed and electrode metal is formed above the buffer layer is known (for example, Patent Document 1: Japanese Patent Application Laid-Open No. 2009-181108).

However, since $SiO_2$ has a higher rigidity than a LN substrate, when a $SiO_2$ layer is formed on a LN substrate, stress is applied not only to the substrate from the $SiO_2$ layer itself, but also stress is inflicted on the substrate via the $SiO_2$ layer from electrode metal formed thereabove. Further, such stress may also adversely affect optical characteristics or electrical characteristics of an optical waveguide element on account of a photoelastic effect of a LN substrate.

Particularly, in an optical waveguide element in which a thin LN substrate (for example, having a thickness equal to or smaller than 20 μm) is formed in order to further intensify interaction between a signal electric field and waveguide light in the substrate (that is, in order to enhance the efficiency of an electric field), stress inflicted on the substrate from a $SiO_2$ layer and electrode metal thereabove may have a non-negligible influence on optical characteristics and/or electrical characteristics and also cause occurrence of a local distortion due to a difference between linear expansion coefficients of the $SiO_2$ layer and the LN substrate, and thus it may become a factor prompting damage such as cracking or disconnection in the $SiO_2$ layer itself or the electrode thereabove at the time of manufacturing and/or over time.

From the foregoing background, in an optical waveguide element, it is required to effectively reduce an optical absorption loss of waveguide light, which may occur due to electrode metal at an intersecting part between an optical waveguide and an electrode, without causing deterioration in optical characteristics and degradation of long-term reliability of the optical waveguide element.

SUMMARY

According to an embodiment of the disclosure, there is provided an optical waveguide element including an optical waveguide formed in a substrate, and an electrode controlling optical waves propagated in the optical waveguide and having an intersecting part intersecting the optical waveguide thereabove. A portion of a resin layer is provided between the optical waveguide and the electrode in a portion of the substrate including the intersecting part. A corner of the resin layer on a side of the electrode is constituted to be a curve in a cross section in an extending direction of the electrode.

According to another embodiment of the disclosure, there is provided an optical modulator including any one of the foregoing optical waveguide elements serving as an optical modulation element performing a modulation of light, a casing for accommodating the optical waveguide element, an optical fiber for inputting light to the optical waveguide element, and an optical fiber for guiding light output by the optical waveguide element to the outside of the casing.

According to still another embodiment of the disclosure, there is provided an optical modulation module including any one of the foregoing optical waveguide elements serving as an optical modulation element performing a modulation of light, and a drive circuit for driving the optical waveguide element.

According to further another embodiment of the disclosure, there is provided an optical transmission device including the optical modulator or the optical modulation module, and an electronic circuit that generates an electrical signal to cause the optical waveguide element to perform modulation operation.

DESCRIPTION OF THE EMBODIMENTS

Regarding a measure to reduce stress applied to a substrate from a $SiO_2$ layer in a constitution in the related art described above, it is conceivable to adopt a constitution in which a $SiO_2$ layer is formed only in a substrate portion where an optical waveguide and an electrode intersect each other instead of providing a $SiO_2$ layer on the entire surface of a substrate and the electrode is formed above the $SiO_2$ layer.

Figure 12:
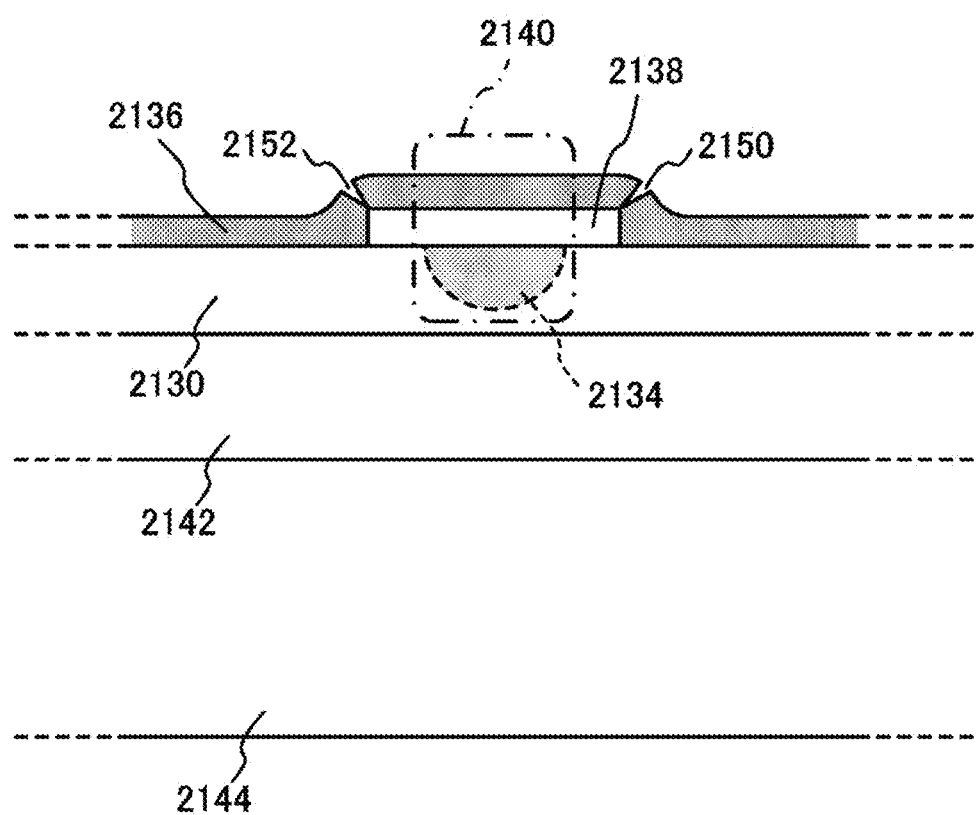
FIG. 12 illustrates an example of a constitution of an intersecting part between an optical waveguide and an electrode in an optical waveguide element in the related art and is a cross-sectional view of the intersecting part in an extending direction of the electrode.

However, as illustrated in FIG. 12, when a portion of a $SiO_2$ layer 2138 is formed on a substrate 2130 at an intersecting part 2140, due to a local distortion caused by a steep change in shape at a stepped portion of the $SiO_2$ layer 2138 or a difference between linear expansion coefficients of the $SiO_2$ layer 2138 and the substrate 2130, a disconnection 2150 or 2152 may occur in an electrode 2136 at a corner part in the vicinity of the $SiO_2$ layer 2138.

In FIG. 12, an optical waveguide 2134 extends in a Y direction in coordinate axes indicated at the upper right part in the diagram. In addition, an electrode (or a signal line) 2136 constituted of a metal layer extends in a Z direction and intersects the optical waveguide 2134 thereabove, thereby forming the intersecting part 2140.

Figure 13:
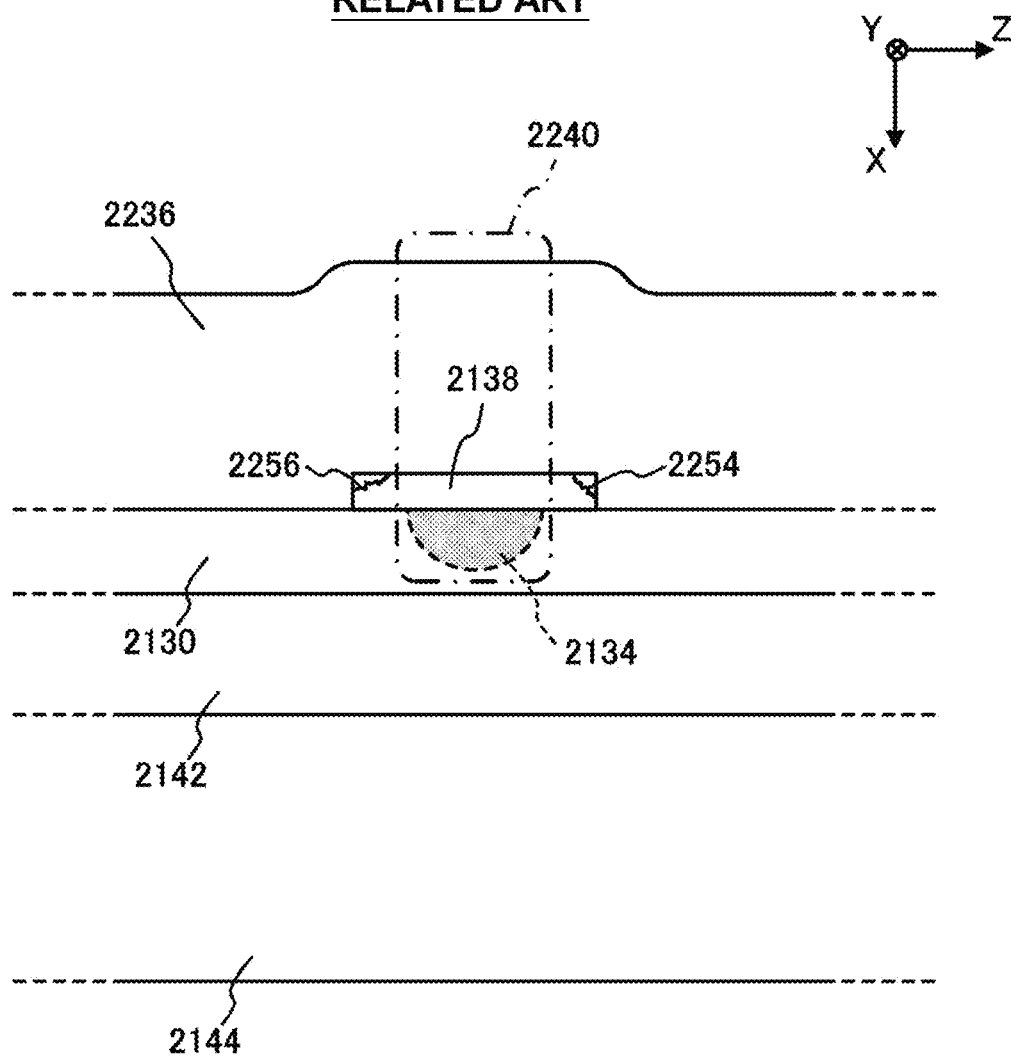
FIG. 13 illustrates another example of a constitution of an intersecting part between an optical waveguide and an electrode in an optical waveguide element in the related art and is a cross-sectional view of the intersecting part in the extending direction of the electrode.

In addition, when an electrode is constituted to be thicker, as illustrated in FIG. 13, at an intersecting part 2240, due to stress from an electrode 2236 (stress or the like accumulated inside the electrode 2236 (metal layer) or on a boundary surface between the electrode 2236 and the $SiO_2$ layer 2138 at the time of forming the metal layer) and/or due to a local distortion caused by the difference between the linear expansion coefficients of the $SiO_2$ layer 2138 and the substrate 2130, cracking 2254 or 2256 may occur at a corner part of the $SiO_2$ layer 2138.

In FIG. 13, the optical waveguide 2134 extends in the Y direction in the coordinate axes indicated at the upper right part in the diagram. In addition, the electrode 2236 constituted of a metal layer extends in the Z direction and intersects the optical waveguide 2134 thereabove, thereby forming the intersecting part 2240.

In FIGS. 12 and 13, the substrate 2130 is a LN substrate thinned to have a thickness equal to or smaller than 20 μm (for example, 10 μm) and is fixed to a portion on a support substrate 2144 with an adhesive layer 2142 therebetween. The support substrate 2144 is a glass substrate, a LN substrate, or a Si substrate, for example.

As in embodiments which will be described below, in an optical modulation element using a Mach-Zehnder optical waveguide, generally, an electrode such as a bias electrode in which a low-frequency signal is propagated is formed to have a thickness within a range of approximately 0.3 to 5 μm, and thus there is concern that breaking may occur in an electrode metal layer as in FIG. 12. In addition, a high-frequency signal electrode in which a modulation signal is propagated is generally formed to have a thickness within a range of approximately 20 to 40 μm, and thus there is concern that cracking may occur in a $SiO_2$ layer as in FIG. 13.

In an optical waveguide element according to the disclosure, occurrence of such disconnection or cracking at an intersecting part between an optical waveguide and an electrode intersecting the optical waveguide thereabove is prevented, and an optical absorption loss of waveguide light due to electrode metal at the intersecting part is effectively reduced without causing deterioration in optical characteristics and degradation of long-term reliability of the optical waveguide element.

Hereinafter, the embodiments of the disclosure will be described with reference to the drawings.

First Embodiment

Figure 1:
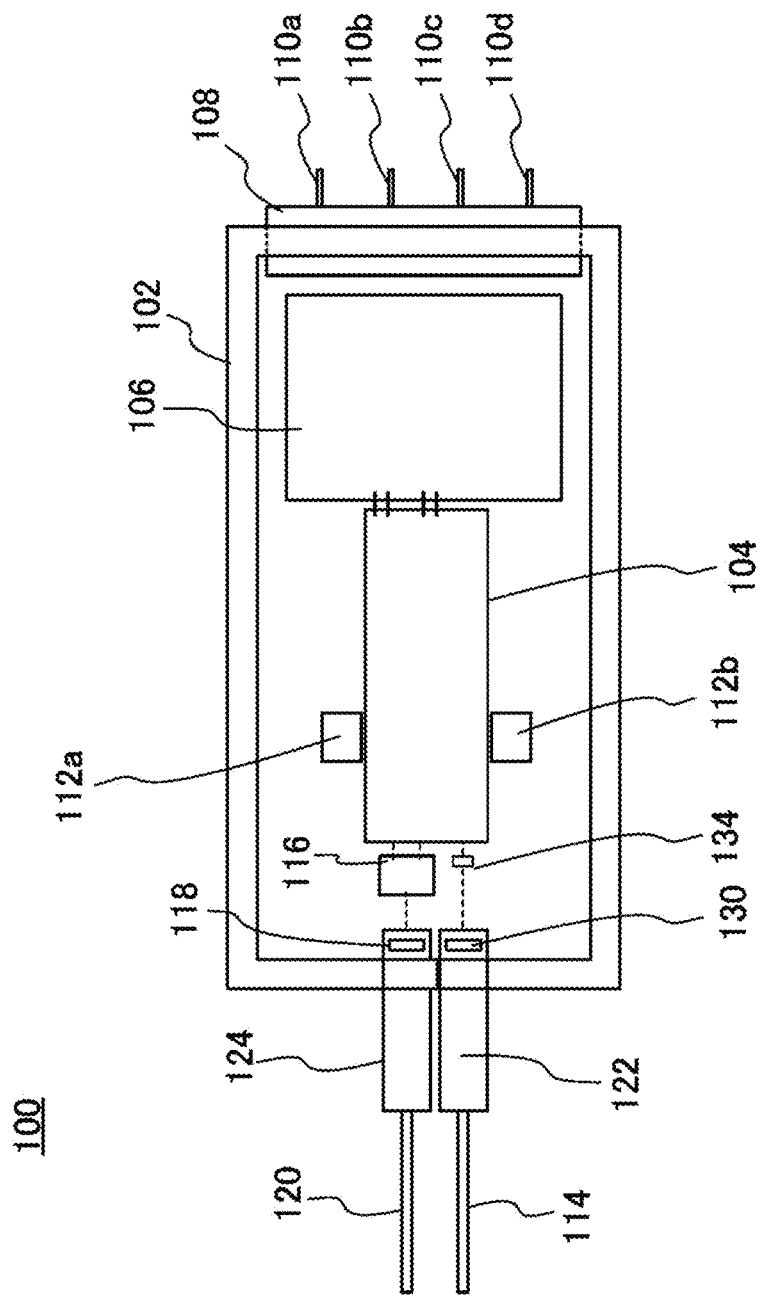
FIG. 1 is a view illustrating a constitution of an optical modulator according to a first embodiment of the disclosure.

FIG. 1 is a view illustrating a constitution of an optical modulator 100 using an optical modulation element serving as an optical waveguide element according to a first embodiment of the disclosure. The optical modulator 100 has a casing 102, an optical modulation element 104 accommodated inside the casing 102, and a relay substrate 106. The optical modulation element 104 is a DP-QPSK modulator, for example. Ultimately, in the casing 102, a cover (plate body, not illustrated) is fixed to an opening thereof, and the inside thereof is sealed in an air-tight manner.

The optical modulator 100 also has signal pins 110a, 110b, 110c, and 110d for inputting a high-frequency electrical signal used for modulation of the optical modulation element 104, and a feed through part 108 for introducing the signal pins 110a, 110b, 110c, and 110d into the casing 102.

Moreover, the optical modulator 100 has an input optical fiber 114 for inputting light to the inside of the casing 102 and an output optical fiber 120 for guiding light modulated by the optical modulation element 104 to the outside of the casing 102 on the same surface of the casing 102.

Here, each of the input optical fiber 114 and the output optical fiber 120 is fixed to the casing 102 with supports 122 and 124 (fixing members) therebetween. Light input from the input optical fiber 114 is collimated by a lens 130 installed inside the support 122 and is input to the optical modulation element 104 via a lens 134. However, this is an example, and light can be input to the optical modulation element 104 in accordance with a technology in the related art, for example, by introducing the input optical fiber 114 into the casing 102 with the support 122 therebetween and connecting an end surface of the introduced input optical fiber 114 to an end surface of a substrate 230 of the optical modulation element 104.

The optical modulator 100 also has an optical unit 116 for polarization-combining two rays of modulated light output from the optical modulation element 104. Light after polarization combining output from the optical unit 116 is concentrated by a lens 118 installed inside the support 124 and is coupled to the output optical fiber 120.

The relay substrate 106 relays a high-frequency electrical signal input from the signal pins 110a, 110b, 110c, and 110d to the optical modulation element 104 through a conductor pattern (not illustrated) formed on the relay substrate 106. The conductor pattern on the relay substrate 106 is individually connected to pads (which will be described below) constituting one end of a signal electrode of the optical modulation element 104 through wire bonding, for example. In addition, the optical modulator 100 includes two terminators 112a and 112b having a predetermined impedance inside the casing 102.

Figure 2:
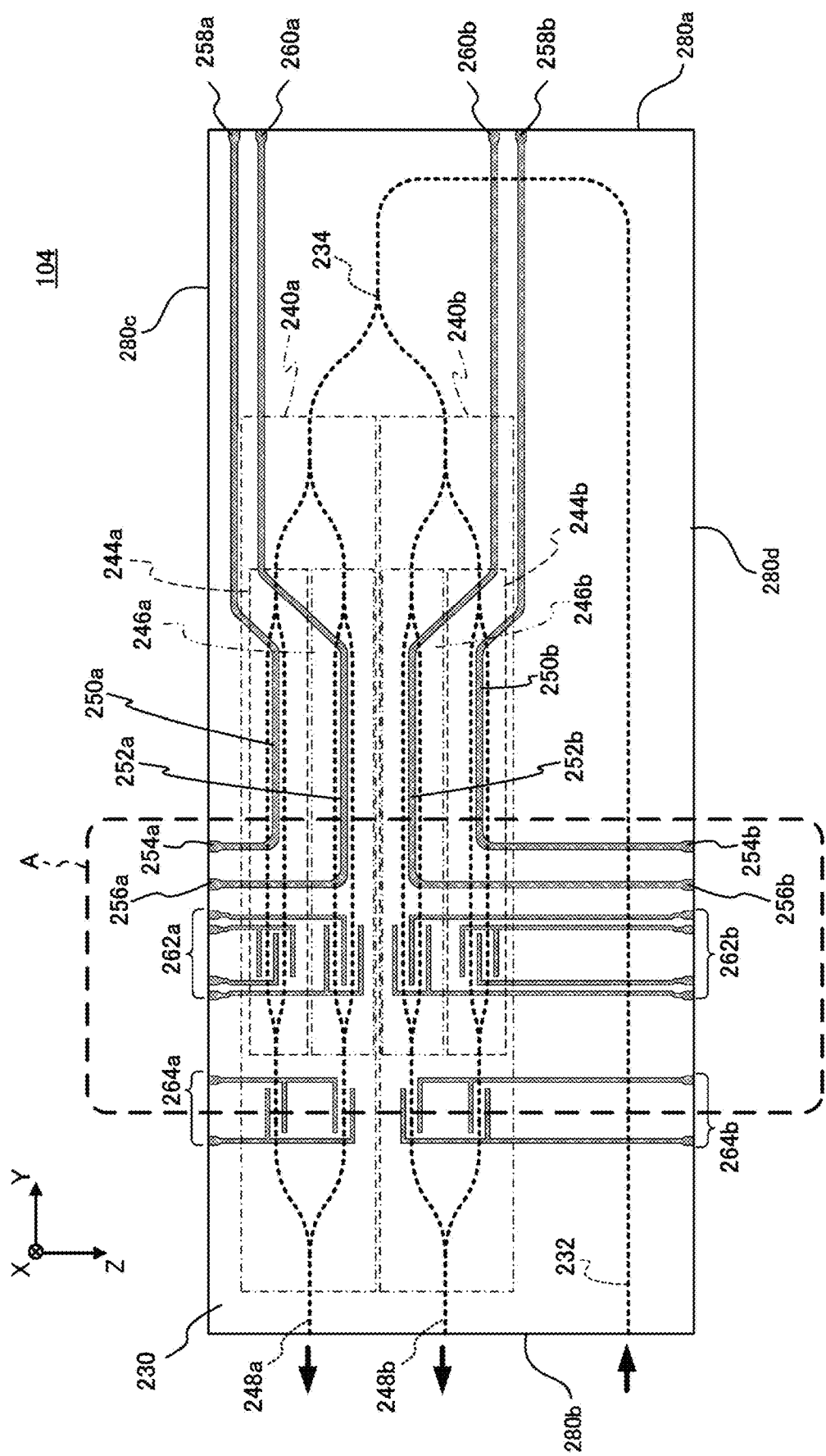
FIG. 2 is a view illustrating a constitution of an optical modulation element used in the optical modulator illustrated in FIG. 1.

FIG. 2 is a view illustrating an example of a constitution of the optical modulation element 104 serving as an optical waveguide element accommodated inside the casing 102 of the optical modulator 100 illustrated in FIG. 1. The optical modulation element 104 is constituted of optical waveguides (bold dotted lines in the diagram) formed on the substrate 230 which is constituted of LN, for example, and performs DP-QPSK modulation of 200 G, for example. These optical waveguides can be formed through thermal diffusion of Ti on a surface of the substrate 230.

The substrate 230 has a rectangular shape, for example, and has two sides 280a and 280b extending in a vertical direction in the diagram and facing each other on the left and the right in the diagram, and sides 280c and 280d extending in a lateral direction in the diagram and facing each other above and below in the diagram. In FIG. 2, as indicated in the coordinate axes at the upper left part in the diagram, a normal direction toward a deeper side of the paper in FIG. 2 (from the front surface to the rear surface) will be referred to as an X direction, the rightward direction in the diagram will be referred to as the Y direction, and the downward direction in the diagram will be referred to as the Z direction.

The optical modulation element 104 includes an input waveguide 232 for receiving input light from the input optical fiber 114 (arrow directed in the rightward direction in the diagram) on a lower side in the diagram of the side 280b on the left side in the diagram in the substrate 230, and a branching waveguide 234 for causing input light to branch into two rays of light having the same amount of light. In addition, the optical modulation element 104 includes so-called nested Mach-Zehnder optical waveguides 240a and 240b (portions individually surrounded by the one-dot dashed line in the diagram) which are two modulation parts for modulating each ray of light that branching off due to the branching waveguide 234.

The nested Mach-Zehnder optical waveguides 240a and 240b respectively include two Mach-Zehnder optical waveguides 244a (a portion within the dotted line in the diagram) and 246a (a portion within the two-dot dashed line in the diagram) and two Mach-Zehnder optical waveguides 244b (a portion within the dotted line in the diagram) and 246b (a portion within the two-dot dashed line in the diagram) respectively provided in two waveguide portions forming pairs of parallel waveguides. Accordingly, the nested Mach-Zehnder optical waveguides 240a and 240b individually perform QPSK modulation of two rays of input light branching off due to the branching waveguide 234 and then output modulated light (output) to the left side in the diagram from output waveguides 248a and 248b respectively.

Thereafter, the two rays of output light are subjected to polarization combining by the optical unit 116 installed outside the substrate 230 and are united into one light beam. Hereinafter, optical waveguides, such as the input waveguide 232, the branching waveguide 234, the nested Mach-Zehnder optical waveguides 240a and 240b, and the Mach-Zehnder optical waveguides 244a, 246a, 244b, and 246b included therein, which are formed on the substrate 230 of the optical modulation element 104 will be generically referred to as an optical waveguide 232 and the like.

Signal electrodes 250a, 252a, 250b, and 252b for respectively causing the four Mach-Zehnder optical waveguides 244a, 246a, 244b, and 246b in total constituting the nested Mach-Zehnder optical waveguides 240a and 240b to perform modulation operation are provided on the substrate 230. The left sides of the signal electrodes 250a and 252a in the diagram are bent and extend to the side 280c on the upper side in the diagram in the substrate 230 and are connected to pads 254a and 256a. In addition, the right sides of the signal electrodes 250a and 252a in the diagram extend to the side 280a on the right side in the diagram in the substrate 230 and are connected to pads 258a and 260a.

Similarly, the left sides of the signal electrodes 250b and 252b in the diagram extend to the side 280d on the lower side in the diagram in the substrate 230 and are connected to pads 254b and 256b, and the right sides of the signal electrodes 250b and 252b in the diagram extend to the side 280a on the right side in the diagram in the substrate 230 and are connected to pads 258b and 260b. The pads 258a, 260a, 258b, and 260b are connected to the relay substrate 106 described above through wire bonding or the like.

The signal electrodes 250a, 252b, 250b, and 252b constitute a coplanar transmission line having a predetermined impedance, for example, together with a ground conductor pattern (not illustrated) formed on the substrate 230 in accordance with the technology in the related art. For example, the ground conductor pattern is provided such that it is not formed on the optical waveguide 232 and the like. A plurality of regions formed to be divided by the optical waveguide 232 and the like in the ground conductor pattern can be connected to each other through wire bonding or the like.

The pads 254a, 256a, 254b, and 256b are connected to the terminators 112a and 112b described above. Accordingly, a high-frequency electrical signal input from the relay substrate 106 connected to the pads 258a, 260a, 258b, and 260b becomes a traveling wave and is propagated in the signal electrodes 250a, 252a, 250b, and 252b, thereby modulating optical waves propagated in the Mach-Zehnder optical waveguides 244a, 246a, 244b, and 246b.

Here, in order to further intensify interaction between an electric field formed inside the substrate 230 by the signal electrodes 250a, 252a, 250b, and 252b and waveguide light propagated in the Mach-Zehnder optical waveguides 244a, 246a, 244b, and 246b and to be able to perform high-speed modulation operation at a lower voltage, the substrate 230 is formed to have a thickness equal to or smaller than 20 μm and to preferably have a thickness equal to or smaller than 10 μm. The rear surface (a surface facing the surface illustrated in FIG. 2) of the substrate 230 is adhered to a support substrate formed of a glass or the like with an adhesive layer therebetween (not illustrated in FIG. 2 but illustrated as an adhesive layer 590 and a support substrate 592 in FIG. 4 and the like, which will be described below).

The optical modulation element 104 is also provided with bias electrodes 262a, 264a, 262b, and 264b for compensating for variation in bias points due to so-called DC drift. The bias electrodes 262a and 262b are respectively constituted of two sets of an electrode pair and are respectively used for compensating for variation in the bias points in the Mach-Zehnder optical waveguides 244a, 246a, 244b, and 246b. In addition, the bias electrodes 264a and 264b are respectively used for compensating for variation in the bias points in the nested Mach-Zehnder optical waveguides 240a and 240b.

The bias electrodes 262a, 264a, 262b, and 264b also extend respectively to the sides 280c and 280d of the substrate 230 and are connected to a bias control circuit outside the casing with lead pins (not illustrated) provided therebetween on a side surface of the casing 102, for example, in portions in the vicinity of the sides 280c and 280d. Accordingly, the bias electrodes 262a, 264a, 262b, and 264b are driven by the bias control circuit, and variation in the bias points in each of the corresponding Mach-Zehnder optical waveguides is compensated for. Hereinafter, the signal electrodes 250a, 252a, 250b, and 252b and the bias electrodes 262a, 264a, 262b, and 264b will be generically referred to as an electrode 250a and the like.

The bias electrodes 262a, 264a, 262b, and 264b are electrodes to which a direct current or a low-frequency electrical signal is applied and are formed to have a thickness within a range of 0.3 μm to 5 μm, for example. In contrast, the signal electrodes 250a, 252b, 250b, and 252b described above are formed within a range of 20 μm to 40 μm, for example, in order to reduce a conductor loss of a high-frequency electrical signal applied to the signal electrode.

The optical modulation element 104 constituted as described above includes many intersecting portions at which the electrode 250a and the like intersect (cross) the optical waveguide 232 and the like thereabove. As easily understood from the illustration of FIG. 2, all the portions in which the bold dotted lines in the diagram indicating the optical waveguide 232 and the like and belt-shaped portions in the diagram indicating the electrode 250a and the like intersect each other in FIG. 2 are intersecting portions at which the electrode 250a and the like intersect the optical waveguide 232 and the like thereabove. In the present embodiment, the optical modulation element 104 includes 50 intersecting portions in total.

Figure 3:
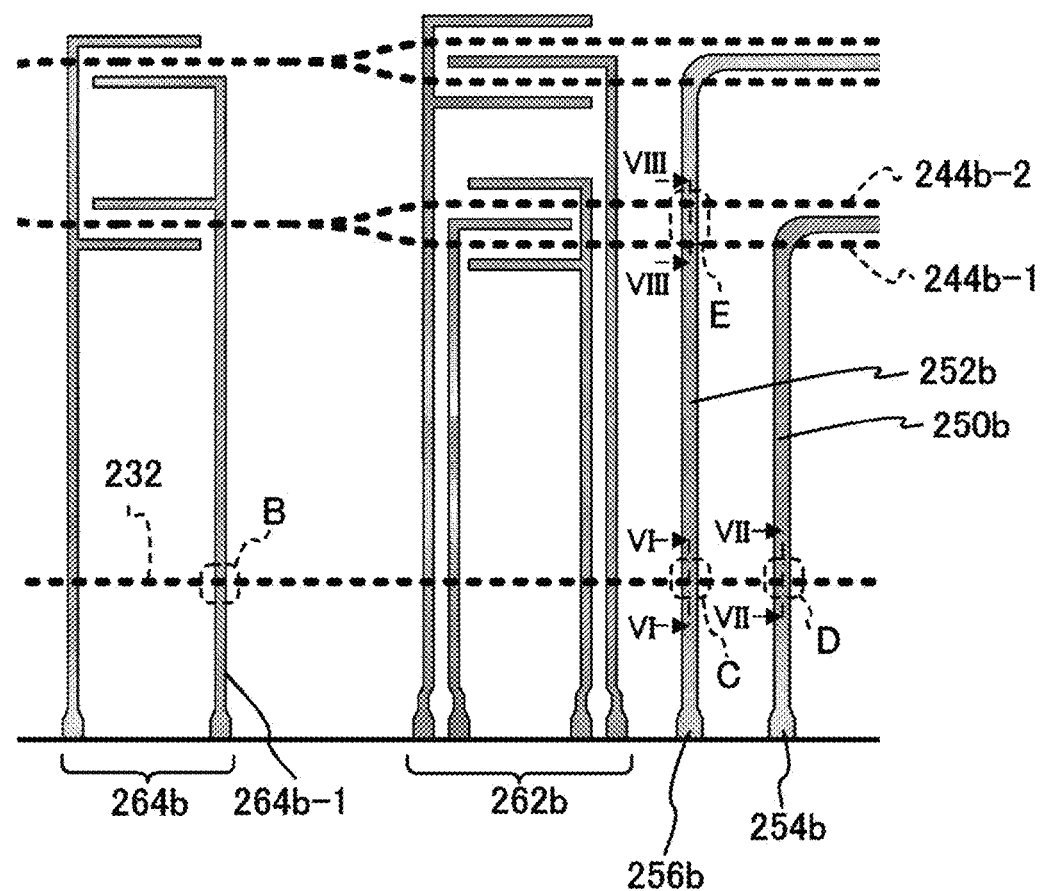
FIG. 3 is a partial detailed view of the part A of the optical modulation element illustrated in FIG. 2.

FIG. 3 is a partial detailed view of the part A of the optical modulation element 104 illustrated in FIG. 2.

Hereinafter, with the part B, the part C, the part D, the part E, and the part F (intersecting portions) illustrated in FIG. 3 as examples, the constitutions of these intersecting portions will be described.

Figure 4:
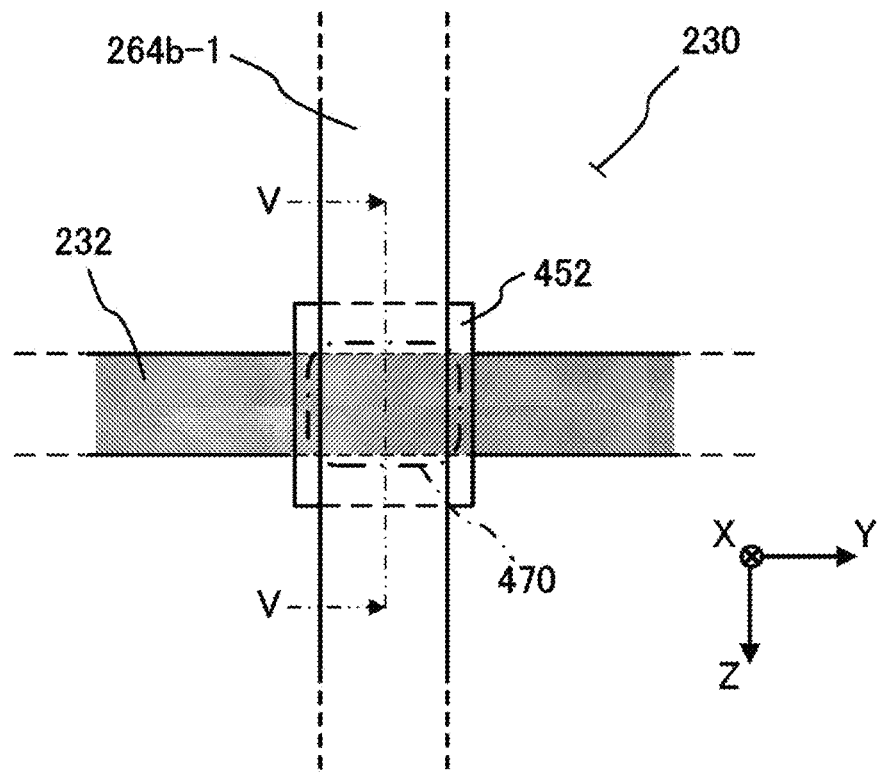
FIG. 4 is a plan view of the part B illustrated in FIG. 3.
Figure 5:
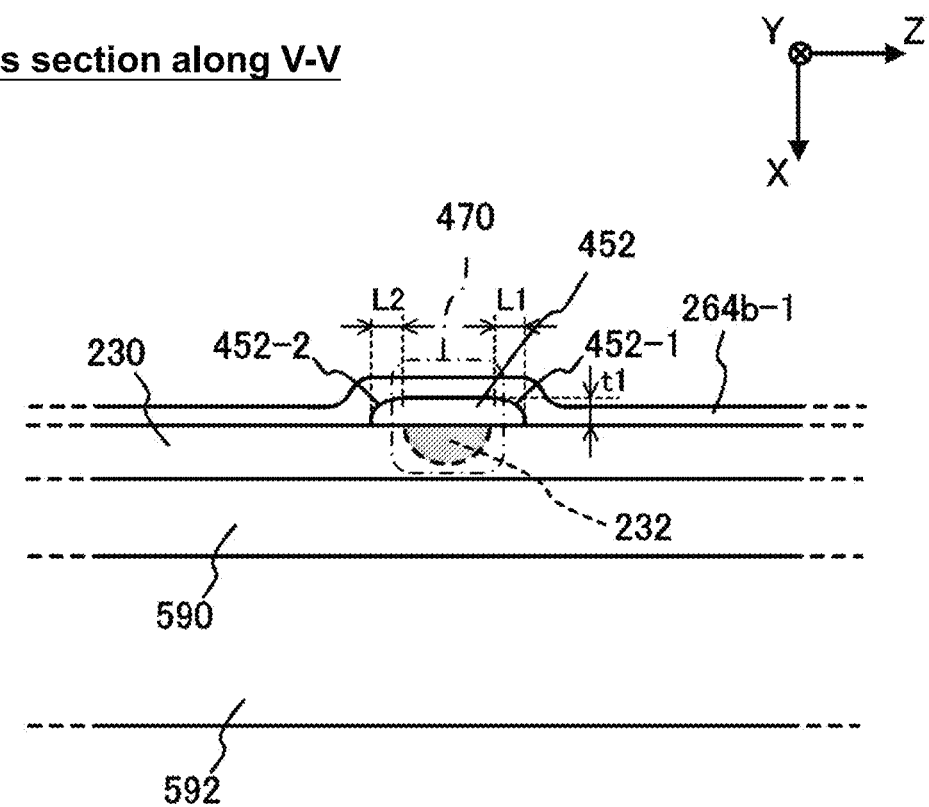
FIG. 5 is a cross-sectional view taken in a direction of the arrow V-V in the part B illustrated in FIG. 4.

First, the constitution of the part B illustrated in FIG. 3 will be described as a first constitution example of the intersecting portion. FIGS. 4 and 5 are partial detailed views illustrating the constitution of the part B in which a bias electrode 264b-1 (a portion of the bias electrode 264b) intersects the input waveguide 232 thereabove. Here, FIG. 4 is a plan view of the part B, and FIG. 5 is a cross-sectional view taken in a direction of the arrow V-V in the part B illustrated in FIG. 4.

The constitutions illustrated in FIGS. 4 and 5 are examples of constitutions of portions in which the optical waveguide 232 and the like and the electrode 250a and the like in the optical modulation element 104 intersect each other and can also be used similarly for arbitrary portions, other than the part B, in which the optical waveguide 232 and the like and the electrode 250a and the like intersect each other.

In FIG. 4, the bias electrode 264b-1 extending in the vertical direction (Z direction) in the diagram intersects the input waveguide 232 extending in the lateral direction (Y direction) in the diagram and forms an intersecting part 470 (a portion surrounded by a rectangular shape of the one-dot dashed line in the diagram).

Particularly, as illustrated in FIG. 5, in the present embodiment, a portion of a resin layer 452 is provided between the input waveguide 232 and the bias electrode 264b-1 in a substrate portion including the intersecting part 470 in the substrate 230. Further, corners of the resin layer 452 on the side of the bias electrode 264b-1 are constituted to be curves 452-1 and 452-2 in a cross section (that is, for example, a cross section illustrated in FIG. 5) in an extending direction of the bias electrode 264b-1. That is, the resin layer 452 is constituted such that a boundary line with respect to the bias electrode 264b-1 leads to an end part of the resin layer 452 at the curves 452-1 and 452-2.

Here, for example, the resin layer 452 can be a photoresist used in a patterning step of the electrode 250a and the like. In addition, portions of the curves 452-1 and 452-2 constituting corners on the side of the bias electrode 264b-1 may be formed, for example, by causing the rate of temperature rise of the foregoing photoresist at the time of high-temperature treatment after patterning to become a rate faster (for example, 5° C./min) than 1° C./min (ordinary rate). Alternatively, portions of the curves 452-1 and 452-2 can be formed, for example, by performing plasma treatment (for example, ashing treatment) on a photoresist constituting the resin layer 452.

In addition, as described above, since the bias electrode 264b-1 is formed to have a thickness within a range of 0.3 μm to 5 μm which is relatively thin, the resin layer 452 is formed to have a thickness within a range of 0.3 μm to 1 μm which is approximately the same as the thickness of a $SiO_2$ layer in the technology in the related art.

In FIG. 5, the substrate 230 is fixed to the support substrate 592 with the adhesive layer 590 therebetween. Here, the adhesive layer 590 is constituted of a thermosetting resin, for example, and the support substrate 592 is constituted of a glass substrate, a LN substrate, or a Si substrate, for example.

In the part B of the optical modulation element 104 having the foregoing constitution, the resin layer 452 is provided between the input waveguide 232 and the bias electrode 264b-1 at the intersecting part 470. Accordingly, occurrence of an absorption loss of waveguide light of the input waveguide 232 due to metal constituting the bias electrode 264b-1 is prevented.

Particularly, a resin such as a photoresist, for example, constituting the resin layer 452 has a Young's modulus within a range of approximately 1 to 2 GPa which is smaller by one order of magnitude than the Young's modulus of $SiO_2$ within a range of 72 GPa to 74 GPa used between an electrode and an optical waveguide in the technology in the related art described above and has a lower rigidity than $SiO_2$. For this reason, in the part B of the optical modulation element 104, stress applied to the substrate 230 from the resin layer 452 itself is reduced compared to a constitution of the technology in the related art using a $SiO_2$ layer, and stress transferred from the bias electrode 264b-1 to the substrate 230 is also reduced. In addition, due to the low rigidity of the resin layer 452 itself as described above, occurrence of a local distortion which may occur in the vicinity of the end part of the resin layer 452 due to the difference between the linear expansion coefficients of the resin layer 452 and the substrate 230 is also curbed.

Moreover, the corners of the resin layer 452 on the side of the bias electrode 264b-1 are constituted to be the curves 452-1 and 452-2 in a cross section in the extending direction of the bias electrode 264b-1 illustrated in FIG. 5, and thus the continuity of the shape of the bias electrode 264b-1 around the corners is enhanced (that is, a steep change in the shape is alleviated). For this reason, together with curbing a distortion due to the foregoing low rigidity of the resin layer 452, occurrence of disconnection in the bias electrode 264b-1 is curbed. Moreover, in addition to curbing the foregoing distortion, concentration of stress from the bias electrode 264b-1 to the corner parts of the resin layer 452 is prevented by the curves 452-1 and 452-2, and thus occurrence of cracking in the resin layer 452 is curbed.

As a result, in the optical modulation element 104, when a constitution similar to that of the part B is also used at other intersecting parts between the electrode 250a and the like and the optical waveguide 232 and the like, it is possible to effectively reduce an optical absorption loss of waveguide light, which may occur due to metal constituting the electrode 250a and the like at the intersecting parts between the optical waveguide 232 and the like and the electrode 250a and the like on the substrate 230, without causing deterioration in optical characteristics and degradation of long-term reliability of the optical modulation element 104.

From the viewpoint of curbing occurrence of cracking at the corners of the resin layer 452 and occurrence of disconnection in the bias electrode 264b-1 around the corners, it is desirable that distances L1 and L2 measured in the extending direction of the bias electrode 264b-1 from starting points of the curves 452-1 and 452-2 constituting the foregoing corners to the end part of the resin layer 452 be longer than a thickness t1 of the resin layer 452. That is, it is desirable that L1≥t1 and L2≥t1 be established.

Figure 6:
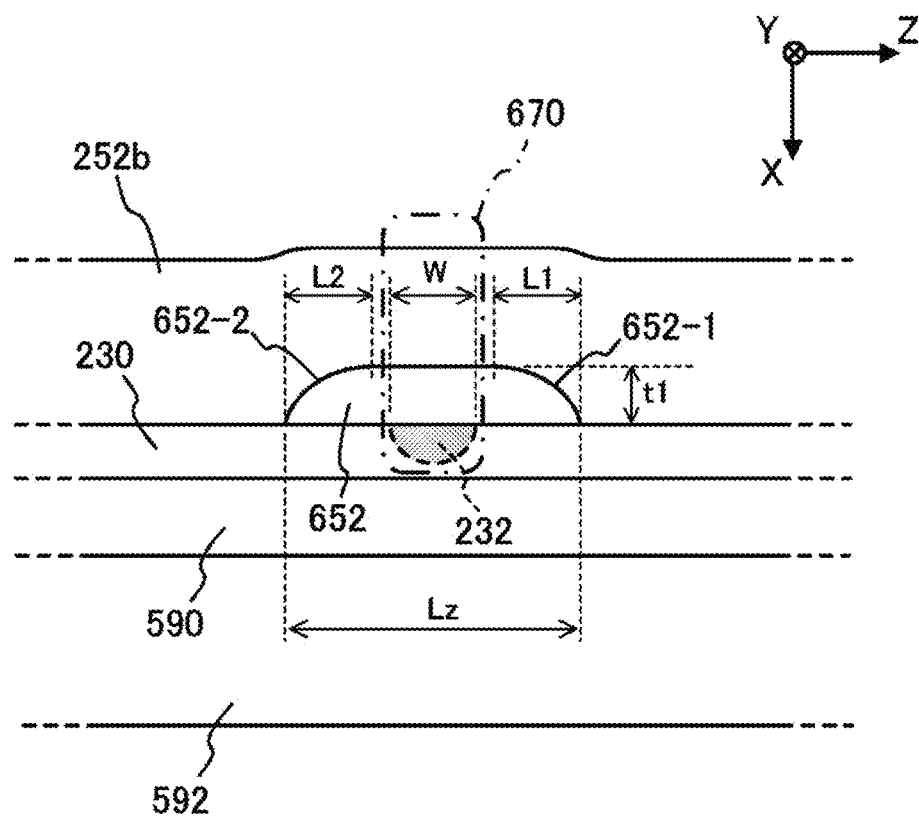
FIG. 6 is a cross-sectional view taken in a direction of the arrow VI-VI in the part C illustrated in FIG. 3.

Next, the constitution of the part C illustrated in FIG. 3 will be described as a second constitution example of the intersecting portion. FIG. 6 is a cross-sectional view taken in a direction of the arrow VI-VI in the part C in which the input waveguide 232 and the signal electrode 252b intersect each other.

The constitution illustrated in FIG. 6 is an example of a constitution of a portion in which the optical waveguide 232 and the like and the electrode 250a and the like intersect each other in the optical modulation element 104 and can also be used similarly for arbitrary portions, other than the part C, in which the optical waveguide 232 and the like and the electrode 250a and the like intersect each other.

In FIG. 6, the signal electrode 252b extending in the lateral direction (Z direction) in the diagram intersects (crosses) the input waveguide 232 above the input waveguide 232 extending in the normal direction (Y direction) of this paper and forms an intersecting part 670 (a portion surrounded by a rectangular shape of the one-dot dashed line in the diagram).

In the constitution of the part C illustrated in FIG. 6, similar to the constitution of the part B illustrated in FIG. 5, a portion of a resin layer 652 is provided between the signal electrode 252b and the input waveguide 232 in a substrate portion including the intersecting part 670 in the substrate 230.

Generally, stress transferred from the electrode 250a and the like to the substrate 230 increases as the thicknesses of the electrode 250a and the like become thicker. Therefore, it is desirable that the thickness t1 of a resin layer provided between the electrode 250a and the like and the optical waveguide 232 and the like become thicker as the electrode 250a and the like have a larger thickness. As described above, the signal electrode 252b is formed to have a thickness within a range of approximately 20 to 40 μm which is thicker by approximately one order of magnitude than the bias electrode 264b and the like formed to have a thickness within a range of approximately 0.3 to 5 μm. For this reason, the thickness t1 of the resin layer 652 illustrated in FIG. 6 is formed to be a thickness within a range of 2 μm to 7.5 μm which is thicker by approximately one order of magnitude than the thickness of a $SiO_2$ layer in the technology in the related art, and the resin layer 652 becomes an extremely thick layer compared to that in the technology in the related art.

In addition, similar to the resin layer 452 illustrated in FIG. 5, corners of the resin layer 652 on a side of the signal electrode 252b are constituted to be curves 652-1 and 652-2 in a cross section (that is, for example, a cross section illustrated in FIG. 6) of the resin layer 652 in the extending direction of the signal electrode 252b. That is, the resin layer 652 is constituted such that a boundary line with respect to the signal electrode 252b leads to an end part of the resin layer 652 at the curves 652-1 and 652-2.

In addition, as the desirable form described above, the resin layer 652 is formed to have the distances L1 and L2 which are measured in the extending direction of the signal electrode 252b from the starting points to the end parts of the curves 652-1 and 652-2 and are larger than the thickness t1 of a resin layer 552 (that is, such that L1≥t1 and L2≥t1 are established). Accordingly, at the intersecting part 670, similar to the intersecting part 470 illustrated in FIG. 5, occurrence of disconnection in the signal electrode 252b in the vicinity of the corner parts of the resin layer 652 can be curbed by enhancing the continuity of the shape of the signal electrode 252b, and occurrence of cracking at the corner parts can be prevented by curbing concentration of stress from the signal electrode 252b to the corner parts of the resin layer 652.

In addition, from the viewpoint of stabilization of light propagation characteristics of the optical waveguide 232 and the like, it is desirable that stress applied from the resin layer 652 to the optical waveguide 232 and the like be uniform. Therefore, on an upper surface of the resin layer 652 (that is, a surface which comes into contact with the signal electrode 252b), a range corresponding to an upper part of the input waveguide 232 (that is, a range of a width W in the diagram) is formed to be flat (that is, the thickness of the resin layer 652 in the range is uniform).

Further, particularly, in the resin layer 652, as a desirable constitution, a length Lz measured in the extending direction of the signal electrode 252b has a value equal to or larger than three times the width W of the input waveguide 232 at the intersecting part 670, that is, Lz≥3 W is established. Accordingly, a contact area between the resin layer 652 and the substrate 230 increases at the intersecting part 670, and thus stress transferred from the signal electrode 252b to the input waveguide 232 via the resin layer 652 is further reduced. For this reason, for example, it is possible to curb change in effective refractive index of the input waveguide 232 due to the foregoing stress on account of a photoelastic effect in the substrate 230 constituted of LN. As a result, for example, when a thick signal electrode 252b exceeding 10 μm is formed, it is possible to prevent deterioration or aggravation in optical characteristics of the optical modulation element 104 caused by stress from the thick signal electrode 252b.

Moreover, in the resin layer 652, as a desirable constitution, the distances L1 and L2 measured in the extending direction of the signal electrode 252b from the starting points to the end parts of the curves 652-1 and 652-2 are formed to be not only larger than the thickness t1 of resin layer 552 but also larger than the width W of the input waveguide 232 at the intersecting part 670 (that is, such that L1≥W and L2≥W are established).

Accordingly, the corner parts of the resin layer 652 in which stress from the signal electrode 252b is likely to be concentrated are distant from the input waveguide 232, and thus the foregoing stress applied to the input waveguide 232 via the resin layer 652 can be further reduced.

The resin layer 652 can be formed through crosslinking reaction by performing high-temperature heating, for example, using a photoresist including a crosslinking agent, for example. In a resin formed of a photoresist including a crosslinking agent, the degree of deformation can be further increased than that of an ordinary photoresist for fine processing through crosslinking reaction and high-temperature treatment (for example, 200° C.), and thus corner parts of a resin layer formed to have a thickness exceeding 1 μm as in the resin layer 652 can be curved extensively and easily. In a photoresist including a crosslinking agent, since contraction accompanied by crosslinking reaction cannot be avoided, although the photoresist is not suitable for fine processing requiring submicron accuracy, there is less change in physical property over time (degeneration) or generation of gas. Thus, in the resin layer 652 which does not require high processing accuracy compared to the optical waveguide 232 and the like, it is preferable to adopt the photoresist as a resin to be used inside an air-tight casing such as the casing 102 over a long term.

Similar to the resin layer 452, the portions of the curves 652-1 and 652-2 included in the resin layer 652 can be formed by causing the rate of temperature rise at the time of high-temperature treatment after patterning to become a rate faster (for example, 5° C./min) than 1° C./min (ordinary rate) and/or performing plasma treatment (for example, ashing treatment) on the photoresist constituting the resin layer 652 in addition to performing the foregoing high-temperature treatment.

In the present embodiment, the signal electrodes 250a, 252b, 250b, and 252b are formed within a range of 20 μm to 40 μm, for example, but the embodiment is not limited thereto. In the cracking 2254 and the cracking 2256 at the corner parts of the SiO$_2$ layer illustrated in FIG. 13, when the thickness of the electrode thereabove is thicker than 10 μm, the probability of occurrence of cracking may increase gradually. Therefore, when the thicknesses of the electrode 250a and the like are thicker than 10 μm at least at the intersecting parts between the electrode 250a and the like and the optical waveguide 232 and the like, due to the constitutions illustrated in FIG. 5 or FIGS. 6 to 9 which will be described below, compared to the constitution in the related art using a SiO$_2$ layer, deterioration in optical characteristics and degradation of long-term reliability of the optical modulation element 104 can be effectively prevented, and an optical absorption loss of waveguide light due to the electrode 250a and the like can be reduced.

Figure 7:
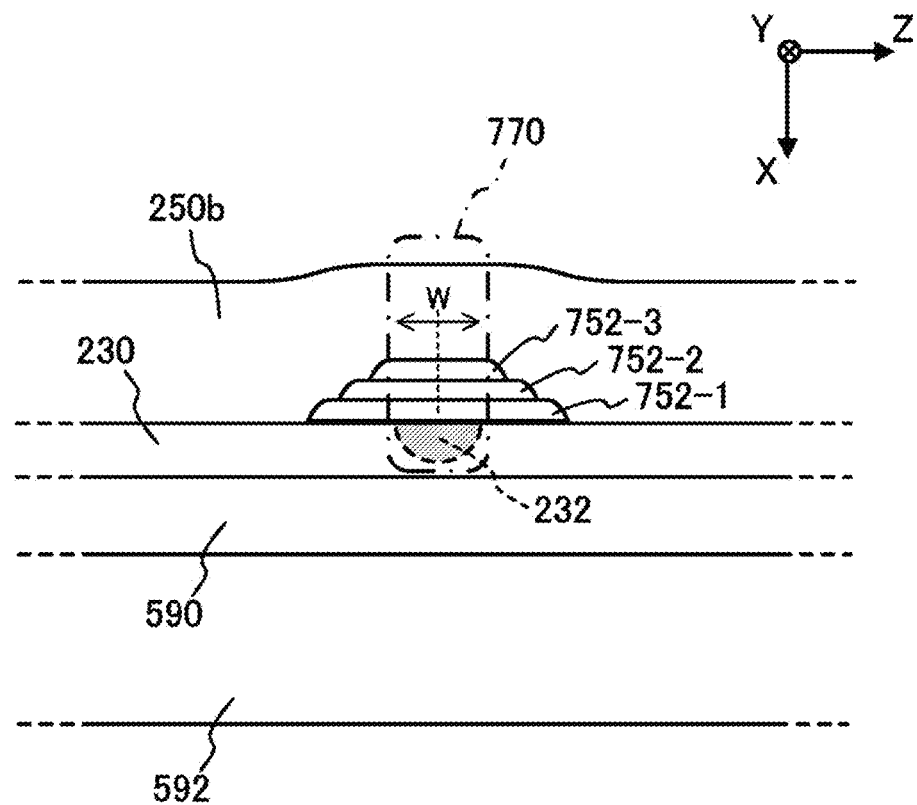
FIG. 7 is a cross-sectional view taken in a direction of the arrow VII-VII in the part D illustrated in FIG. 3.

Next, the constitution of the part D illustrated in FIG. 3 will be described as a third constitution example of the intersecting portion. FIG. 7 is a cross-sectional view taken in a direction of the arrow VII-VII in the part D in which the input waveguide 232 and the signal electrode 250b intersect each other. The constitution illustrated in FIG. 7 is an example of a constitution of a portion in which the optical waveguide 232 and the like and the electrode 250a and the like intersect each other in the optical modulation element 104 and can also be used similarly for arbitrary portions, other than the part D, in which the optical waveguide 232 and the like and the electrode 250a and the like intersect each other.

In FIG. 7, the signal electrode 250b extending in the lateral direction (Z direction) in the diagram intersects (crosses) the input waveguide 232 above the input waveguide 232 extending in the normal direction (Y direction) of this paper and forms an intersecting part 770 (a portion surrounded by a rectangular shape of the one-dot dashed line in the diagram).

Further, a portion of a plurality (for example, three) of resin layers 752-1, 752-2, and 752-3 is provided between the signal electrode 250b and the input waveguide 232 in the substrate portion including the intersecting part 770 in the substrate 230. Further, corners of each of the resin layers 752-1, 752-2, and 752-3 on a side of the signal electrode 250b are constituted to be curves. In addition, the resin layers 752-1, 752-2, and 752-3 are provided in a stacked manner to have stepped heights when measured from the surface of the substrate 230 in the extending direction of the signal electrode 250b. The desirable conditions for L1, L2, Lz, and the like described above may be applied to each of the resin layers 752-1, 752-2, and 752-3.

In the constitution illustrated in FIG. 7, the plurality of resin layers 752-1, 752-2, and 752-3 is formed in a stepped shape in the extending direction of the signal electrode 250b. Thus, together with forming the curved corner parts of these resin layers, the continuity of the shape of the signal electrode 250b at the intersecting part 770 can be further enhanced (that is, the degree of change in shape can be further alleviated), and occurrence of disconnection in the signal electrode 250b at the intersecting part 770 can be better curbed. In addition, since the resin layers 752-1, 752-2, and 752-3 formed to have curved corner parts are formed in a stepped shape, stress from the signal electrode 250b is applied in a manner of being dispersed to each of the corner parts of the resin layers, and thus occurrence of cracking in these corner part is better curbed.

In addition, since a plurality of resin layers is used, the thicknesses of the resin layers 752-1, 752-2, and 752-3 in their entirety can be made desired thicknesses, and the layer thickness of each of the resin layers 752-1, 752-2, and 752-3 can be made equal to or smaller than a certain thickness. For this reason, for example, the positions and the shapes of the resin layers 752-1, 752-2, and 752-3 in their entirety can be set with high accuracy and the thicknesses in their entirety can have large values in accordance with the thickness of the signal electrode 250b by constituting each resin layer of an ordinary photoresist having submicron processing accuracy.

Figure 8:
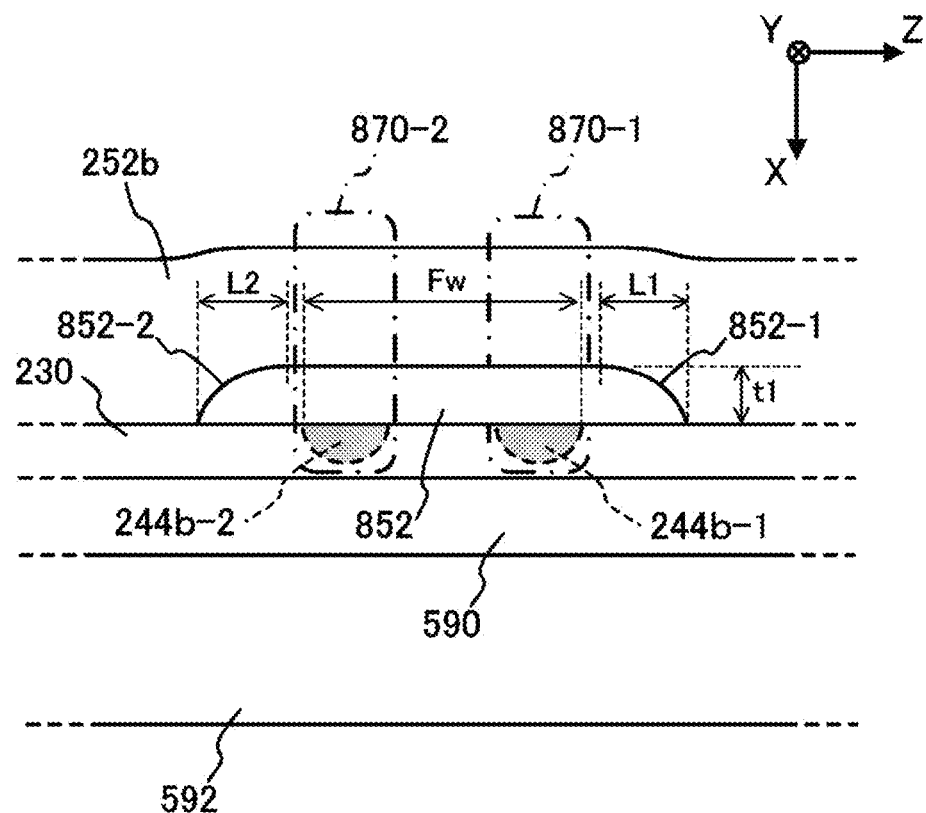
FIG. 8 is a cross-sectional view taken in a direction of the arrow VIII-VIII in the part E illustrated in FIG. 3.

Next, the constitution of the part E illustrated in FIG. 3 will be described as a fourth constitution example of the intersecting portion. In the present constitution example, one resin layer is provided in a straddling manner between two intersecting parts. FIG. 8 is a cross-sectional view taken along VIII-VIII in the part E including two intersecting parts 870-1 and 870-2 at which the signal electrode 252b intersects each of two parallel waveguides 244b-1 and 244b-2 above the parallel waveguides 244b-1 and 244b-2 constituting the Mach-Zehnder optical waveguide 244b.

The constitution illustrated in FIG. 8 can be similarly applied not only to intersecting parts between parallel waveguides constituting a Mach-Zehnder optical waveguide and an electrode but also to arbitrary intersecting portions at which the optical waveguide 232 and the like and the electrode 250a and the like intersect each other, that is, a plurality of adjacent intersecting parts.

In FIG. 8, the signal electrode 252b extending in the lateral direction (Z direction) in the diagram intersects (crosses) the parallel waveguides 244b-1 and 244b-2 above the parallel waveguides 244b-1 and 244b-2 extending in the normal direction (Y direction) of this paper and forms each of the intersecting parts 870-1 and 870-2.

Further, a resin layer 852 provided between the signal electrode 252b and the substrate 230 is formed to extend in a straddling manner between adjacent intersecting parts 870-1 and 870-2. Accordingly, the resin layers 852 are provided between the signal electrode 252b and the parallel waveguides 244b-1 and 244b-2 at the intersecting parts 870-1 and 870-2.

In addition, corners of the resin layer 852 on the side of the signal electrode 252b are constituted to be curves 852-1 and 852-2 in a cross section (that is, for example, a cross section illustrated in FIG. 8) in the extending direction of the signal electrode 252b. That is, the resin layer 852 is constituted such that a boundary line with respect to the signal electrode 252b leads to an end part of the resin layer 852 at the curves 852-1 and 852-2.

According to the foregoing constitution, since one resin layer 852 is provided in a straddling manner between the plurality of intersecting parts 870-1 and 870-2, the number of resin layers to be formed on the substrate 230 can be reduced, and a manufacturing yield can be improved. In addition, as a result of providing one resin layer 852 in a straddling manner between the plurality of intersecting parts 870-1 and 870-2, the area of a portion of the resin layer 852 in contact with the surface of the substrate 230 increases, and thus adhesion of the resin layer 852 with respect to the substrate 230 can be improved.

Moreover, when the resin layer 852 is formed in a straddling manner between the intersecting parts 870-1 and 870-2, the thickness of a range having a width Fw in the resin layer 852 including the intersecting parts 870-1 and 870-2 can be easily formed to be a uniform thickness. For this reason, as in the constitution illustrated in FIG. 8, when two adjacent intersecting parts 870-1 and 870-2 include the parallel waveguides 244b-1 and 244b-2, conditions for stress or the like received by each of the two parallel waveguides 244b-1 and 244b-2 from the resin layer 852 (and/or via the resin layer 852) are made uniform so that an additional difference between optical phases of the parallel waveguides 244b-1 and 244b-2 caused by nonuniformity of the stress or the like can be curbed and additional variation in operation points in the Mach-Zehnder optical waveguide 244b due to the provided resin layer 852 can be curbed.

Next, the constitution of the part F illustrated in FIG. 3 will be described as a fifth constitution example of the intersecting portion. In the present constitution example, in order to reduce an optical absorption loss due to the electrode 250a and the like, a $SiO_2$ layer similar to that in the technology in the related art is provided on the optical waveguide 232 and the like, and a resin layer is provided thereabove as a protective layer for preventing cracking of the $SiO_2$ layer and/or disconnection in the electrode as illustrated in FIGS. 12 and 13.

Figure 9:
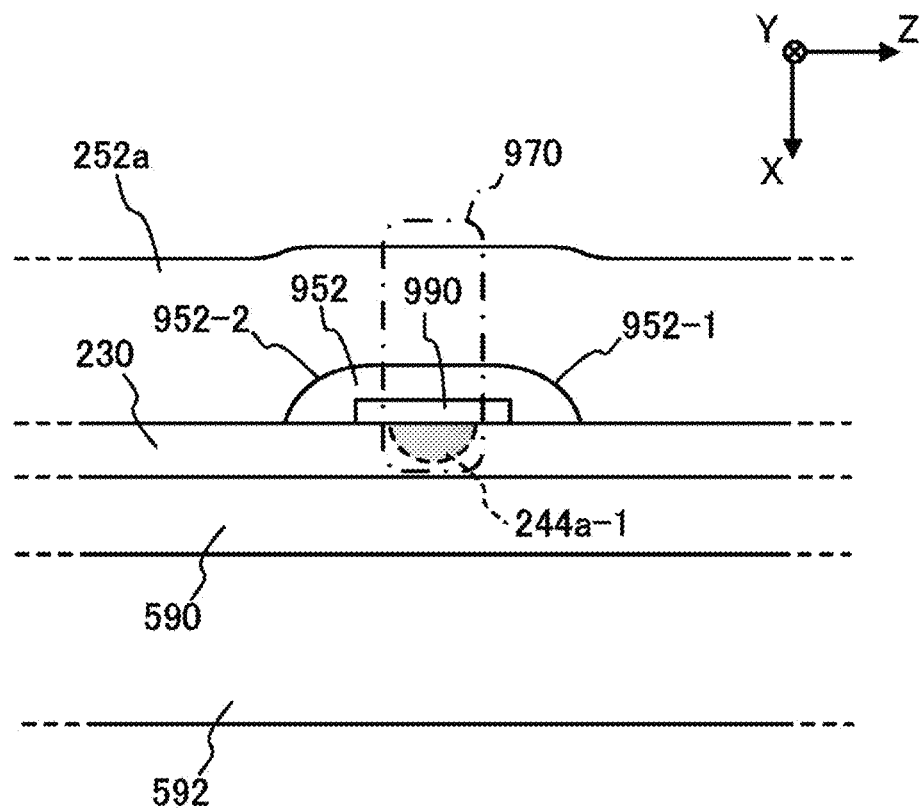
FIG. 9 is a cross-sectional view taken in a direction of the arrow IX-IX in the part F illustrated in FIG. 3.

FIG. 9 is a cross-sectional view taken along IX-IX in the part F in which the signal electrode 252a intersects a parallel waveguide 244a-1 (one of the Mach-Zehnder optical waveguide 244a) thereabove. The constitution illustrated in FIG. 9 is an example of a constitution of a portion in which the optical waveguide 232 and the like and the electrode 250a and the like intersect each other in the optical modulation element 104 and can also be used similarly for arbitrary portions, other than the part F, in which the optical waveguide 232 and the like and the electrode 250a and the like intersect each other.

In FIG. 9, the signal electrode 252a extending in the lateral direction (Z direction) in the diagram intersects (crosses) the parallel waveguide 244a-1 above the parallel waveguide 244a-1 extending in the normal direction (Y direction) of this paper and forms an intersecting part 970 (a portion surrounded by a rectangular shape of the one-dot dashed line in the diagram).

Similar to the technology in the related art, a $SiO_2$ layer 990 is formed on the parallel waveguide 244a-1 at the intersecting part 970. However, differing from the technology in the related art, a resin layer 952 is provided between the $SiO_2$ layer 990 and the signal electrode 252a at the intersecting part 970. Accordingly, similar to the intersecting part 470 illustrated in FIG. 5, the intersecting part 970 has a constitution in which a portion of the resin layer 952 is provided between the signal electrode 252a and the parallel waveguide 244a-1 in the substrate portion including the intersecting part 970. Further, corners of the resin layer 952 on a side of the signal electrode 252a are constituted as curves 952-1 and 952-2. Here, similar to the technology in the related art, the thickness of the $SiO_2$ layer is 0.5 µm, for example, which is a thickness sufficient for reducing an optical absorption loss in the parallel waveguide 244a-1 due to the signal electrode 252a. In addition, the resin layer 952 is formed to have a thickness of 3 µm, for example.

According to the foregoing constitution, at the intersecting part 970, the $SiO_2$ layer 990 provided on the parallel waveguide 244a-1 is protected by the resin layer 952, and thus cracking can be prevented from occurring at the corner parts of the $SiO_2$ layer 990 due to stress from the signal electrode 252a. In addition, similar to the intersecting part 470 illustrated in FIG. 5 and the intersecting part 670 illustrated in FIG. 6, the curves 952-1 and 952-2 constituting the corners of the resin layer 952 can prevent cracking from occurring in the resin layer 952 due to stress from the signal electrode 252a and can prevent disconnection from occurring in a portion of the signal electrode 252a in the vicinity of the corner parts of the resin layer 952.

Particularly, the constitution illustrated in FIG. 9 is preferably adopted when it is intended to curb disconnection in the electrode 250a and the like at the intersecting parts utilizing high electrical insulation properties, transparency, and temporal stability of the $SiO_2$ layer.

Second Embodiment

Figure 10:
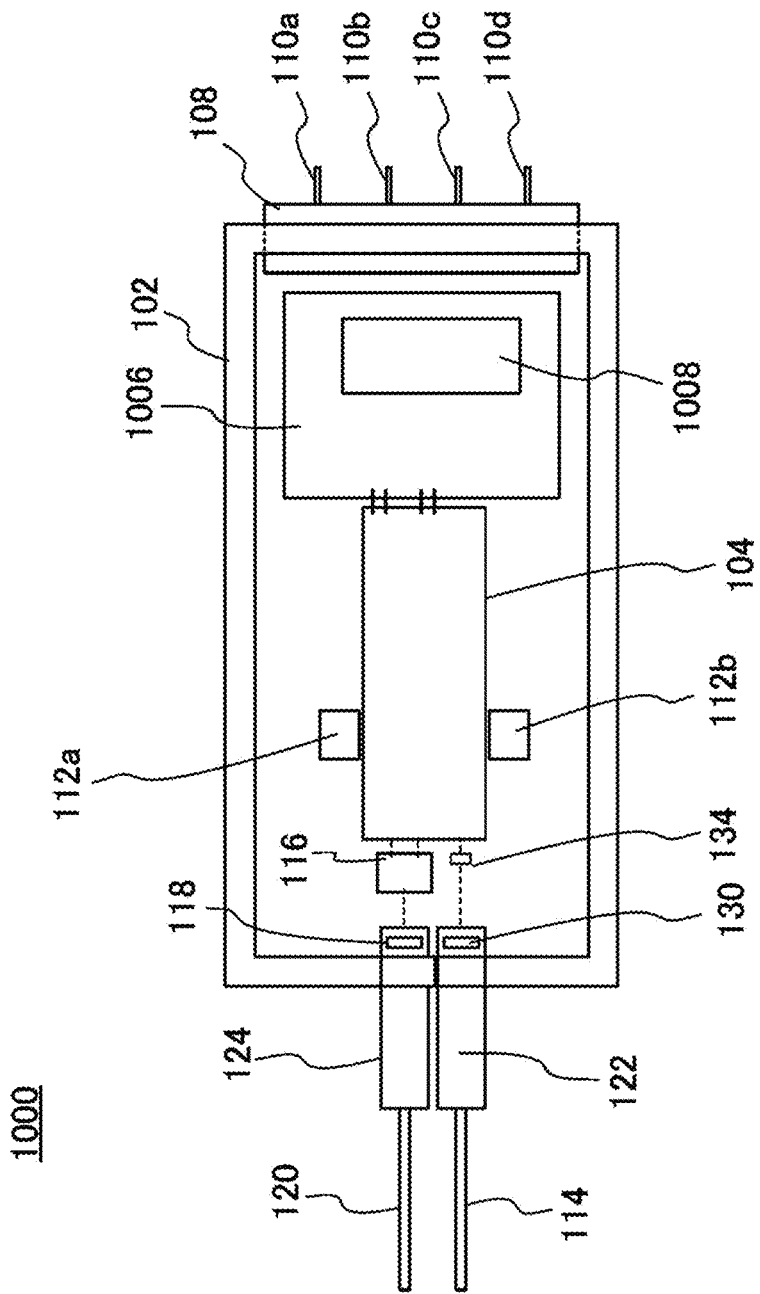
FIG. 10 is a view illustrating a constitution of an optical modulation module according to a second embodiment of the disclosure.

Next, a second embodiment of the disclosure will be described. The present embodiment relates to an optical modulation module 1000 using the optical modulation element 104 included in the optical modulator 100 according to the first embodiment. FIG. 10 is a view illustrating a constitution of the optical modulation module 1000 according to the present embodiment. In FIG. 10, the same constituent elements as those in the optical modulator 100 according to the first embodiment illustrated in FIG. 1 will be described using the same reference signs as the reference signs indicated in FIG. 1, and the foregoing description in FIG. 1 will be invoked by reference.

The optical modulation module 1000 has a constitution similar to that of the optical modulator 100 illustrated in FIG. 1 but differs from the optical modulator 100 in including a circuit substrate 1006 in place of the relay substrate 106. The circuit substrate 1006 includes a drive circuit 1008. The drive circuit 1008 generates a high-frequency electrical signal for driving the optical modulation element 104 and outputs the generated high-frequency electrical signal to the optical modulation element 104, for example, on the basis of a modulation signal supplied from the outside via the signal pins 110a, 110b, 110c, and 110d.

Similar to the optical modulator 100 according to the first embodiment described above, the optical modulation module 1000 having the foregoing constitution includes the optical modulation element 104 having the constitution as illustrated in FIGS. 4 to 9 at the intersecting portions between the optical waveguide 232 and the like and the electrode 250a and the like. For this reason, in the optical modulation module 1000, similar to the optical modulator 100, favorable optical transmission can be performed by effectively reducing an optical absorption loss of waveguide light which may occur at the intersecting portions between the optical waveguide 232 and the like and the electrode 250a and the like on the substrate 230 and realizing favorable modulation characteristics without causing deterioration in optical characteristics and degradation of long-term reliability of the optical modulation element 104.

Third Embodiment

Figure 11:
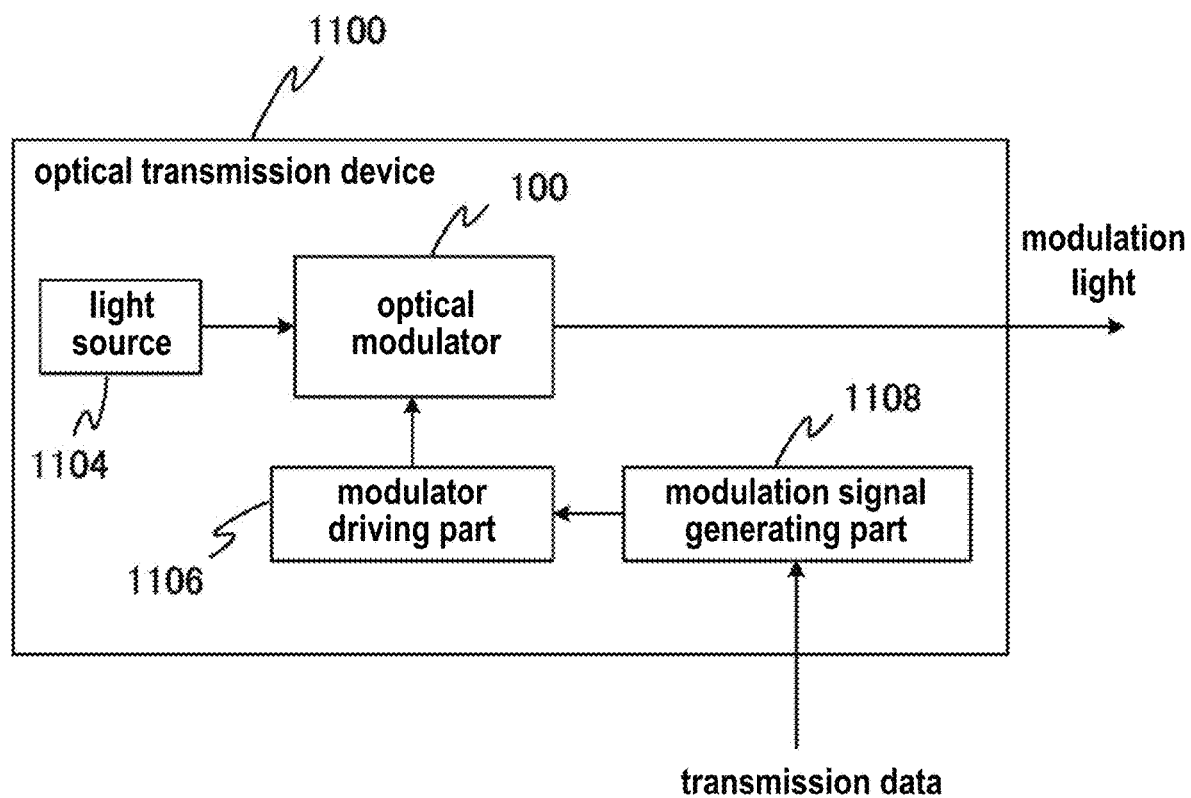
FIG. 11 is a view illustrating a constitution of an optical transmission device according to a third embodiment of the disclosure.

Next, a third embodiment of the disclosure will be described. The present embodiment relates to an optical transmission device 1100 equipped with the optical modulator 100 according to the first embodiment. FIG. 11 is a view illustrating a constitution of the optical transmission device 1100 according to the present embodiment. This optical transmission device 1100 has the optical modulator 100, a light source 1104 for causing light to be incident on the optical modulator 100, a modulator driving part 1106, and a modulation signal generating part 1108. In place of the optical modulator 100 and the modulator driving part 1106, the optical modulation module 1000 described above can be used.

The modulation signal generating part 1108 is an electronic circuit for generating an electrical signal such that the optical modulator 100 performs modulation operation. The modulation signal generating part 1108 generates a modulation signal which is a high-frequency signal for causing the optical modulator 100 to perform optical modulation operation in accordance with the modulation data and outputs the generated modulation signal to the modulator driving part 1106 on the basis of transmission data applied from the outside.

The modulator driving part 1106 amplifies a modulation signal input from the modulation signal generating part 1108 and outputs four high-frequency electrical signals for driving the four signal electrodes 250a, 252a, 250b, and 252b of the optical modulation element 104 included in the optical modulator 100.

The four high-frequency electrical signals are input to the signal pins 110a, 110b, 110c, and 110d of the optical modulator 100 to drive the optical modulation element 104. Accordingly, light output from the light source 1104 is subjected to DP-QPSK modulation, for example, by the optical modulator 100 and is output from the optical transmission device 1100 as modulation light.

Particularly, since the optical transmission device 1100 uses the optical modulator 100 including the optical modulation element 104 which may effectively reduce an optical absorption loss at the intersecting portions between the optical waveguide 232 and the like and the electrode 250a and the like, favorable modulation characteristics can be realized, and favorable optical transmission can be performed.

The disclosure is not limited to the constitutions of the foregoing embodiments and substitution constitutions thereof and can be performed in various forms within a range not departing from the gist thereof.

For example, in the first embodiment described above, in the optical modulation element 104, regarding the part B which is an intersecting portion between the input waveguide 232 and the bias electrode 264b-1, the part C which is an intersecting portion between the input waveguide 232 and the signal electrode 252b, the part D which is an intersecting portion between the input waveguide 232 and the signal electrode 250b, the part E including two intersecting portions between the parallel waveguides 244b-1 and 244b-2 and the signal electrode 252b, and the part F which is an intersecting portion between the parallel waveguide 244a-1 and the signal electrode 252a respectively have the constitutions illustrated in FIGS. 4, 5, 6, 7, 8, and 9, but the embodiment is not limited thereto.

The optical modulation element 104 serving as an optical waveguide element can have any of the constitutions illustrated in FIGS. 4, 5, 6, 7, 8, and 9 for a part or all of the intersecting portions between the optical waveguide 232 and the like and the electrode 250a and the like. Therefore, for example, any of the constitutions illustrated in FIGS. 6 to 9 illustrating the intersecting parts including the signal electrode 250b, 252b, or 252a can be applied to any intersecting part including the bias electrode 264b and the like.

In addition, as will be easily understood by those skilled in the art, distinct constitutions of the part B, the part C, the part D, the part E, and the part F illustrated in FIGS. 4, 5, 6, 7, 8, and 9 may be combined and can be applied to any intersecting part between the optical waveguide 232 and the like and the electrode 250a and the like. For example, a plurality of resin layers stacked in a multistage manner can be formed at the intersecting portions between the optical waveguide 232 and the like and the electrode 250a and the like, in which a SiO$_2$ layer is formed, by combining the constitution in FIG. 7 and the constitution in FIG. 9.

In addition, for example, a plurality of resin layers stacked in a multistage manner may be formed in a straddling manner between two intersecting parts by combining the constitution in FIG. 7 and the constitution in FIG. 8. Alternatively, a plurality of resin layers stacked in a multistage manner may be formed in a straddling manner between two adjacent intersecting parts between the optical waveguide 232 and the like and the electrode 250a and the like, in which a SiO$_2$ layer is formed, by combining FIGS. 8 and 9.

In addition, regarding the constitution of the part D illustrated in FIG. 7, a constitution consisting of three resin layers such as the resin layers 752-1, 752-2, and 752-3 as a plurality of resin layers stacked in a multistage manner has been illustrated, but the constitution is not limited thereto. The number of resin layers stacked in a multistage manner can be two, four, or more.

In addition, regarding the constitution of the part F illustrated in FIG. 9, a constitution in which the SiO$_2$ layer 990 is provided on the parallel waveguide 244a-1 has been illustrated, but the constitution is not limited thereto. An insulating layer or a transparent insulating layer constituted of an arbitrary material having a refractive index and electrical insulation properties higher than those of the optical waveguide 232 and the like, such as SiN in addition to SiO$_2$, can be formed above the optical waveguide 232 and the like (for example, a layer constituted of SiN or the like).

In addition, in the first embodiment described above, the intersecting part included in the part B or the part F is constituted to have the electrode 250a and the like and the optical waveguide 232 and the like orthogonal to each other, but the embodiment is not limited thereto. The constitutions of the intersecting parts in FIGS. 3 to 9 described above can be applied to an intersecting part between the electrode 250a and the like and the optical waveguide 232 and the like formed by the electrode 250a and the like crossing the optical waveguide 232 and the like thereabove, that is, an intersecting part at which the electrode 250a and the like intersect the optical waveguide 232 and the like at an arbitrary angle (not parallel to each other).

In addition, in the embodiments described above, as an example of the optical waveguide element, the optical modulation element 104 using the substrate 230 formed of LN (LiNbO$_3$) has been illustrated, but the embodiments are not limited thereto. The optical waveguide element can be an element which is constituted of a substrate made of an arbitrary material (InP, Si, or the like in addition to LN) and has an arbitrary function (an optical switch, an optical directional coupler, or the like in addition to optical modulation).

As described above, the foregoing optical modulator 100 according to the first embodiment includes the optical modulation element 104. The optical modulation element 104 serving as an optical waveguide element has the optical waveguide 232 and the like which are formed on the substrate 230, and the electrode 250a and the like which are electrodes for controlling optical waves propagated in the optical waveguide 232 and the like and have the intersecting part 470 and the like intersecting the optical waveguide 232 and the like thereabove. Further, a portion of the resin layer 452 and the like is provided between the optical waveguide 232 and the like and the electrode 250a and the like in a portion including the intersecting part 470 and the like in the substrate 230, and corners of the resin layer 452 and the like on a side of the electrode 250a and the like are constituted to be curves in a cross section in the extending direction of the electrode 250a and the like.

According to this constitution, it is possible to effectively reduce an optical absorption loss of waveguide light which may occur due to electrode metal at the intersecting part 470 and the like between the optical waveguide 232 and the like and the electrode 250a and the like on the substrate 230 without causing deterioration in optical characteristics and degradation of long-term reliability of the optical modulation element 104.

In addition, in the optical modulation element 104, the distance measured in the extending direction of the electrode 250a and the like from the starting points to the end parts of the curves constituting the foregoing corners in the foregoing cross section in the resin layer 452 and the like has a value larger than the heights of the resin layer 452 and the like measured from the surface of the substrate 230. According to this constitution, when the corners of the resin layer 452 and the like are constituted to be curves having a curvature equal to or greater than a certain value, the continuity of the shapes of the electrode 250a and the like at the intersecting part 470 and the like can be further enhanced, and stress applied to the corner parts of the resin layer from the electrode 250a and the like can be further dispersed. For this reason, disconnection in the electrode 250a and the like at the intersecting part 470 and the like and occurrence of cracking at the corner parts of the resin layer 452 and the like can be curbed more effectively. As a result, deterioration in optical characteristics and degradation of long-term reliability of the optical modulation element 104 can be prevented more effectively, and an optical absorption loss of waveguide light which may occur due to electrode metal at the intersecting part 470 and the like between the optical waveguide 232 and the like and the electrode 250a and the like on the substrate 230 can be reduced.

In addition, for example, the resin layer 652 of the optical modulation element 104 is provided over a distance equal to or longer than three times the width of the input waveguide 232 at the intersecting part 670 in the extending direction of the signal electrode 252b. According to this constitution, since intensive action of stress of the signal electrode 252b on the optical waveguide is curbed, for example, change in effective refractive index of the optical waveguide on account of a photoelastic effect in the substrate 230 constituted of LN can be curbed. As a result, for example, when a thick signal electrode 252b exceeding 10 μm is formed, it is possible to prevent deterioration or aggravation in optical characteristics of the optical modulation element 104 caused by stress from the thick signal electrode 252b.

In addition, for example, the plurality of resin layers 752-1, 752-2, and 752-3 is provided between the input waveguide 232 and the signal electrode 250*b* at the intersecting part 770 of the optical modulation element 104 in a manner of being stacked in a stepped shape in the extending direction of the signal electrode 250*b*. According to this constitution, the continuity of the shapes of the intersecting part 770 or the signal electrode 250*b* therearound can be further enhanced, and occurrence of disconnection in the signal electrode 250*b* at the intersecting part 770 and occurrence of cracking at the corner parts of the resin layer 752-1 and the like can be further curbed.

In addition, for example, the $SiO_2$ layer 990 (insulating layer) is formed between the parallel waveguide 244*a*-1 and the resin layer 952 at the intersecting part 970 of the optical modulation element 104. According to this constitution, for example, occurrence of disconnection in the signal electrode 252*a* can be curbed and occurrence of cracking in the $SiO_2$ layer 990 and the resin layer 952 can be prevented utilizing high electrical insulation properties, transparency, and temporal stability of $SiO_2$.

In addition, for example, a resin constituting the resin layer 652 of the optical modulation element 104 is a resin formed using a photoresist including a crosslinking agent. According to this constitution, compared to a case of using an ordinary photoresist for fine processing, curve portions can be easily and extensively formed at the corner parts of the resin layer 652.

In addition, for example, the resin layer 852 of the optical modulation element 104 is formed in a manner of straddling between adjacent intersecting parts 870-1 and 870-2. According to this constitution, the contact area between the resin layer 852 and the substrate 230 is increased, and thus adhesion of the resin layer 852 with respect to the substrate 230 can be improved. In addition, since the resin layer 852 can be easily formed with equal thickness in a range including two intersecting parts, for example, the thickness of the resin layer 852 can be formed to have the same thickness at the two intersecting parts 870-1 and 870-2 including two parallel waveguides 244*b*-1 and 244*b*-2 of the Mach-Zehnder optical waveguide 244*b*, and the conditions for stress or the like received by each of the two foregoing parallel waveguides from the resin layer 852 can be made uniform. As a result, additional variation in operation points in the Mach-Zehnder optical waveguide 244*b* can be curbed, and thus favorable modulation characteristics can be realized.

In addition, in the optical modulation element 104, the electrode 250*a* and the like are formed to be thicker than 10 μm at least at the intersecting parts between the electrode 250*a* and the like and the optical waveguide 232 and the like. In addition, in the optical modulation element 104, the substrate 230 has a thickness equal to or smaller than 20 According to these constitutions, in a case of using a $SiO_2$ layer as in the technology in the related art, even when an electrode constitution and a substrate constitution in which the frequency of occurrence of disconnection in the electrode and occurrence of cracking at the corner parts in the $SiO_2$ layer is likely to be relatively high are employed, occurrence of disconnection and cracking can be effectively curbed.

In addition, the optical modulator according to the first embodiment includes any optical modulation element 104 serving as an optical waveguide element, the casing 102 for accommodating the optical modulation element 104, the input optical fiber 114 for inputting light to the optical modulation element 104, and the output optical fiber 120 for guiding light output by the optical modulation element 104 to the outside of the casing 102.

In addition, the optical modulation module 1000 according to the second embodiment includes the optical modulation element 104 serving as an optical waveguide element performing modulation of light, and the drive circuit 1008 for driving the optical modulation element 104.

In addition, the optical transmission device 1100 according to the third embodiment includes the optical modulator 100 or the optical modulation module 1000, and the modulation signal generating part 1108 that is an electronic circuit for generating an electrical signal such that the optical modulation element 104 performs modulation operation.

According to these constitutions, it is possible to realize the optical modulator 100, the optical modulation module 1000, or the optical transmission device 1100 having favorable characteristics.

Other Configurations

According to an embodiment of the disclosure, there is provided an optical waveguide element including an optical waveguide formed in a substrate, and an electrode controlling optical waves propagated in the optical waveguide and having an intersecting part intersecting the optical waveguide thereabove. A portion of a resin layer is provided between the optical waveguide and the electrode in a portion of the substrate including the intersecting part. A corner of the resin layer on a side of the electrode is constituted to be a curve in a cross section in an extending direction of the electrode.

According to the configuration of the disclosure, in the resin layer, a distance measured in the extending direction of the electrode from a starting point to an end part of the curve constituting the corner in the cross section may be longer than a height of the resin layer measured from a surface of the substrate.

According to the configuration of the disclosure, the resin layer may be provided over a distance equal to or longer than three times a width of the optical waveguide at the intersecting part in the extending direction of the electrode.

According to the configuration of the disclosure, at the intersecting part, a plurality of the resin layers may be provided between the optical waveguide and the electrode in a manner of being stacked in a stepped shape in the extending direction of the electrode.

According to the configuration of the disclosure, at the intersecting part, an insulating layer comprising $SiO_2$ may be formed between the optical waveguide and the resin layer.

According to the configuration of the disclosure, a resin constituting the resin layer may be a resin formed using a photoresist including a crosslinking agent.

According to the configuration of the disclosure, the resin layer may be formed in a manner of straddling the adjacent intersecting part.

According to the configuration of the disclosure, the electrode may be formed to be thicker than 10 μm at least at the intersecting part.

According to the configuration of the disclosure, the substrate may have a thickness equal to or smaller than 20 μm.

According to another embodiment of the disclosure, there is provided an optical modulator including any one of the foregoing optical waveguide elements serving as an optical modulation element performing a modulation of light, a casing for accommodating the optical waveguide element, an optical fiber for inputting light to the optical waveguide element, and an optical fiber for guiding light output by the optical waveguide element to the outside of the casing.

According to still another embodiment of the disclosure, there is provided an optical modulation module including any one of the foregoing optical waveguide elements serving as an optical modulation element performing a modulation of light, and a drive circuit for driving the optical waveguide element.

According to further another embodiment of the disclosure, there is provided an optical transmission device including the optical modulator or the optical modulation module, and an electronic circuit that generates an electrical signal to cause the optical waveguide element to perform modulation operation.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical waveguide element, comprising:
an optical waveguide formed in a substrate; and
an electrode controlling optical waves that are propagated in the optical waveguide and having an intersecting part intersecting the optical waveguide thereabove,
wherein a portion of a resin layer is provided between the optical waveguide and the electrode in a portion of the substrate including the intersecting part,
wherein an upper surface of the resin layer is in direct contact with a bottom surface of the electrode and a bottom surface of the resin layer opposite to the upper surface is in direct contact with a top surface of the optical waveguide, and
wherein the upper surface of the resin layer curves down toward the top surface of the optical waveguide at an edge of the upper surface of the resin layer to relief a stress created by a corner of the resin layer to the electrode above the resin layer.

2. The optical waveguide element according to claim 1, wherein in the resin layer, a distance measured in the extending direction of the electrode from a starting point to an end part of the curve constituting the corner in the cross section is longer than a height of the resin layer measured from a surface of the substrate.

3. The optical waveguide element according to claim 1, wherein the resin layer is provided over a distance equal to or longer than three times a width of the optical waveguide at the intersecting part in the extending direction of the electrode.

4. The optical waveguide element according to claim 1, wherein at the intersecting part, a plurality of the resin layers is provided between the optical waveguide and the electrode in a manner of being stacked in a stepped shape in the extending direction of the electrode.

5. The optical waveguide element according to claim 1, wherein at the intersecting part, an insulating layer comprising $SiO_2$ is formed between the optical waveguide and the resin layer.

6. The optical waveguide element according to claim 1, wherein a resin constituting the resin layer is a resin formed using a photoresist including a crosslinking agent.

7. The optical waveguide element according to claim 1, wherein the resin layer is formed in a manner of straddling the adjacent intersecting part.

8. The optical waveguide element according to claim 1, wherein the electrode is formed to be thicker than 10 μm at least at the intersecting part.

9. The optical waveguide element according to claim 1, wherein the substrate has a thickness equal to or smaller than 20 μm.

10. An optical modulator comprising:
the optical waveguide element according to claim 1 serving as an optical modulation element performing a modulation of light;
a casing for accommodating the optical waveguide element;
an optical fiber for inputting light to the optical waveguide element; and
an optical fiber for guiding light output by the optical waveguide element to an outside of the casing.

11. An optical modulation module comprising:
the optical waveguide element according to claim 1 serving as an optical modulation element performing a modulation of light; and
a drive circuit for driving the optical waveguide element.

12. An optical transmission device comprising:
the optical modulator according to claim 10; and
an electronic circuit that generates an electrical signal to cause the optical waveguide element to perform a modulation operation.

13. An optical transmission device comprising:
the optical modulation module according to claim 11; and
an electronic circuit that generates an electrical signal to cause the optical waveguide element to perform a modulation operation.

* * * * *